(12) United States Patent
Dorsey et al.

(10) Patent No.: US 10,867,452 B2
(45) Date of Patent: Dec. 15, 2020

(54) SYSTEM AND METHODS FOR CONVERSION OF 2D ASSETS INTO 3D GRAPHICAL SCENES

(71) Applicant: Mental Canvas LLC, Madison, CT (US)

(72) Inventors: Julie Dorsey, Madison, CT (US); Steven Gortler, Waltham, MA (US); Leonard McMillan, Chapel Hill, NC (US); Sydney Shea, Spartanburg, SC (US)

(73) Assignee: Mental Canvas LLC, New York, NY (US)

( * ) Notice: Subject to any disclaimer, the term of this patent is extended or adjusted under 35 U.S.C. 154(b) by 0 days.

(21) Appl. No.: 15/467,572

(22) Filed: Mar. 23, 2017

(65) Prior Publication Data
US 2017/0278310 A1 Sep. 28, 2017

Related U.S. Application Data

(60) Provisional application No. 62/313,478, filed on Mar. 25, 2016.

(51) Int. Cl.
| | |
|---|---|
| *G06T 15/10* | (2011.01) |
| *G06T 19/20* | (2011.01) |
| *G06F 3/0484* | (2013.01) |
| *G06F 3/0481* | (2013.01) |
| *G06F 3/0488* | (2013.01) |
| *G06F 3/0354* | (2013.01) |

(52) U.S. Cl.
CPC .......... *G06T 19/20* (2013.01); *G06F 3/04815* (2013.01); *G06F 3/04842* (2013.01); *G06F 3/04845* (2013.01); *G06F 3/04883* (2013.01); *G06F 3/03547* (2013.01); *G06F 2203/04808* (2013.01); *G06T 2200/24* (2013.01); *G06T 2219/2016* (2013.01)

(58) Field of Classification Search
CPC ............ G06F 3/04845; G06F 3/04883; G06F 3/04815; G06F 17/24; G06T 19/20; G06T 11/20; G06T 11/203; G06T 13/20; G06T 19/003

See application file for complete search history.

(56) References Cited

U.S. PATENT DOCUMENTS

| | | | |
|---|---|---|---|
| 2011/0041098 A1* | 2/2011 | Kajiya | G06F 3/04815 715/849 |
| 2011/0199536 A1* | 8/2011 | Wolf | G06K 9/42 348/441 |
| 2012/0151416 A1* | 6/2012 | Bell | G02B 27/2228 715/848 |
| 2013/0222385 A1* | 8/2013 | Dorsey | G06T 11/20 345/427 |
| 2015/0363980 A1* | 12/2015 | Dorta | G06T 19/20 345/419 |

* cited by examiner

*Primary Examiner* — Weiming He
(74) *Attorney, Agent, or Firm* — Goodwin Procter LLP

(57) ABSTRACT

A computer-implemented method of and system for converting a two-dimensional drawing into a navigable three-dimensional computer graphics representation of a scene that includes inputting the two-dimensional drawing, embedding some portion of the two-dimensional drawings onto one or more two-dimensional planes, arranging the two-dimensional planes in a virtual three-dimensional space; and outputting the arranged two-dimensional planes into the three-dimensional computer graphics representation of the scene.

19 Claims, 8 Drawing Sheets

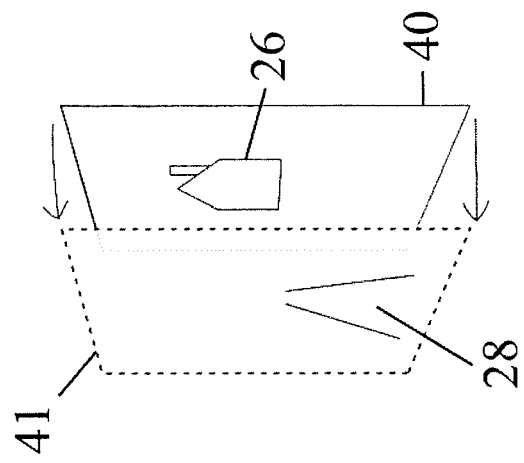
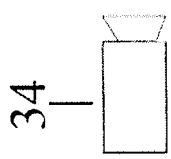
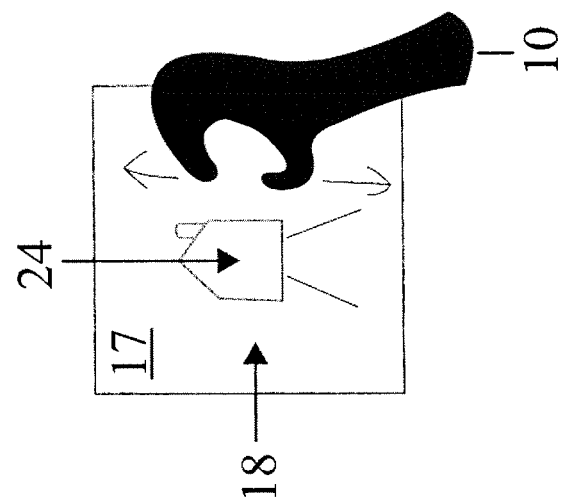
*Figure 4B*
*Figure 4A*

SYSTEM AND METHODS FOR CONVERSION OF 2D ASSETS INTO 3D GRAPHICAL SCENES

CROSS-REFERENCE TO RELATED APPLICATIONS

This application claims priority to and the benefit of U.S. Provisional Patent Application No. 62/313,478, filed Mar. 25, 2016, the disclosure of which is incorporated herein by reference in its entireties.

FIELD OF THE INVENTION

The present invention relates to a new user-interactive system for transforming a single two-dimensional drawing or image into a navigable, three-dimensional computer graphics representation of a scene.

BACKGROUND OF THE INVENTION

In the field of computer vision, there exist fully or mostly automatic techniques that attempt to create a three-dimensional (3D) representation of a scene from input image data and, more typically, two-dimensional (2D) image data. For example, some automatic methods require a user to add linear markings on the images. Disadvantageously, the output geometry is inferred mathematically by the system. As a result, such systems do not work well with drawings as input and the results are not controllable.

In the field of computer graphics, there are many techniques that allow a user to create virtual 3D scenes, onto various surfaces on which 2D image data may be subsequently pasted or projected. Typically, with such methods, the geometry of the 3D scene is constructed first, and then image data may be affixed to the 3D scene. As a result, the process is staged and not an integrated process.

There are also a few known systems that allow a user to augment a raster image with a depth value per pixel using various interfaces. Indeed, conventionally, the end result is a representation that includes one or more 2D raster images with added depth per pixel. Disadvantageously, this process cannot work where the input drawings are in a vector—rather than a raster—format. For example, a "Tour into the picture" approach allows a user to transform a 2D raster image into a 3D navigable scene consisting of a plurality of planes arranged in 3D with raster drawing data affixed. Disadvantageously, this system only allows for a very restricted output scene, which, for example, may consist of five faces of an interior of a cube shape (called "the spidery mesh") as well as a hierarchy of flat canvases that must be arranged to be perpendicular to a previous (or "parent") canvas in the representation.

BRIEF SUMMARY OF THE INVENTION

It would be desirable to provide a method that is not an automatic method in any way, but that provides a tool that an artist may use to construct a 3D scene. More particularly, it would be desirable to provide a tool that enables the user to build the 3D scene simultaneously as the user moves 2D images and drawing data into the 3D space in a single, integrated process. Such a method differs from prior methods in which 3D representations include a number of individual 2D planes arranged in 3D space with drawing data affixed. It would also be desirable to enable a user to input original 2D drawings or images in raster and/or vector form.

Briefly, according to the present invention, the output 3D computer graphics scene includes a number of 2D planes (or "canvases") arranged in a virtual 3D space, such as that described in U.S. Pat. No. 9,153,062 to Dorsey, et al., which is incorporated in its entirety herein. Embedded on each of these planes or canvases is a portion of the original 2D input drawing or image that is projected onto the plane. Advantageously, this system and method may be used to turn artwork from a page of an illustrated book into a novel navigable 3D scene.

In a first aspect, some embodiment of the invention relate to a computer-implemented method of converting a 2D drawing into a navigable 3D computer graphics representation of a scene using a system having a graphical user interface with a touch-sensitive display unit. For example, in some implementations, the method includes inputting the 2D drawing, embedding some portion of the 2D drawing onto one or more 2D plane, arranging the 2D plane(s) in virtual 3D space, and outputting the arranged 2D plane(s) into the 3D computer graphics representation of the scene. In some variations, the 2D drawing is input in raster form, in vector form, or in a combination of raster and vector form. In other variations, the 2D drawing is input in multiple 2D layers.

One or more of the following features may also be included. The 3D computer graphics representation of the scene may be built concurrently with introducing portions of the 2D drawing into the virtual 3D space. The selected 2D plane may be rotated about an axis of rotation.

In some implementations, the method may also include updating the 3D computer graphics representation of the scene. For example, updating the 3D computer graphics representation of the scene may include selecting a two-dimensional plane having a current camera view and containing some content for modification, designating (e.g., using a wand tool or a lasso tool) a portion of the selected two-dimensional plane to modify, positioning a reference camera within the three-dimensional space, at least one of selecting and creating a second two-dimensional plane, choosing at least one of: a pinching hand gesture for modifying a distance between the reference camera and the second two-dimensional plane and establishing an axis of rotation on the selected two-dimensional plane about which some portion of the second two-dimensional plane may be rotated, and centrally projecting some portion of the content from the selected two-dimensional plane onto the second two-dimensional plane using the reference camera as a projection center.

Alternatively, updating the 3D computer graphics representation of the scene may include selecting a two-dimensional plane to modify, designating some portion of the selected two-dimensional plane to modify, and choosing at least one of a pinching hand gesture for modifying a distance between a first location of the portion of the selected two-dimensional plane within the three-dimensional space and a second location of the portion of the selected two-dimensional plane and establishing an axis of rotation on the selected two-dimensional plane about which the portion of the selected two-dimensional plane may be rotated.

In some variations, pinching a user's fingers together against touch-sensitive display unit moves the selected 2D plane or a second 2D plane farther away from the reference camera, while pinching a user's fingers apart against the touch-sensitive display unit moves the selected 2D plane closer to the reference camera. In other variations, establishing an axis of rotation comprises designating a first point on a touch-sensitive display unit and a second point on the touch-sensitive display unit through which the axis of rotation passes. For example, rotating the selected or the second 2D plane about the axis of rotation comprises running a user's finger along the touch-sensitive display unit in a direction of desired rotation from the axis of rotation.

In another aspect, embodiments of the invention relate to a system for generating a navigable 3D graphic scene space from at least one 2D drawing. For example, in some implementations, the system includes a programmable processor; a touch-sensitive display unit; and memory for storing machine-readable instructions executable by the processor. The user can now choose either to move the selected 2D plane or to centrally project the artwork onto a second movable plane and can further choose at least one of: modify a distance between the reference camera and the selected or second 2D plane and establish an axis of rotation on the selected 2D or second plane. In some implementations, the instructions further cause the processor to update the 3D computer graphics representation of the scene.

BRIEF DESCRIPTION OF THE DRAWINGS

The foregoing features and advantages of embodiments of the invention will become more apparent from a reading of the following description in connection with the accompanying drawings, in which:

FIGS. 4A and 4B illustrate an exemplary method of placing and projecting a 2D image onto a new canvas, in accordance with some embodiments of the present invention;

DETAILED DESCRIPTION

The present invention provides a system and method for converting one or more two-dimensional (2D) drawings into a navigable three-dimensional (3D) computer graphics representation of a scene that creates a more general scene arrangement with an easy user interface. Advantageously, the invention allows for centrally projecting artwork from one plane onto a second plane and then translating and/or rotating the second plane.

In the context of an integrated drawing system, a "pinching for parallel" interface and a "hinge for angled" interface have been previously described in U.S. Pat. No. 9,153,062 to Dorsey, et al. and U.S. patent application Ser. No. 14/610,646, which are each incorporated herein in their entirety. Use of these interfaces in a system designed to convert existing artwork from its input 2D format into a new canvas in 3D space will now be described.

The present invention provides the following advantages over the prior art "Tour into the picture" approach. First, input may be composed of raster data as well as vector data. Input data may be in the form of multiple layers. The "hinge for angled" interface allows a newly created canvas to be in an arbitrary orientation with respect to a parent plane within the 3D space. For example, a point used as the center of projection may be positioned to move image data from its original location on a selected 2D canvas to a new position on a second 2D canvas at a second location in 3D space. In short, according to the present system, each 2D drawing or image is assumed to exist on a single planar canvas in an otherwise empty 3D environment. A virtual reference camera with a view direction orthogonal to this single plane observes the 2D drawing or image. When multiple layers are involved, each layer may be placed on an independent canvas and the canvases placed coincidentally in 3D space. Resultingly, the system and method enable a user to update a 3D representation of a scene by iteratively applying the following steps.

Figure 5:
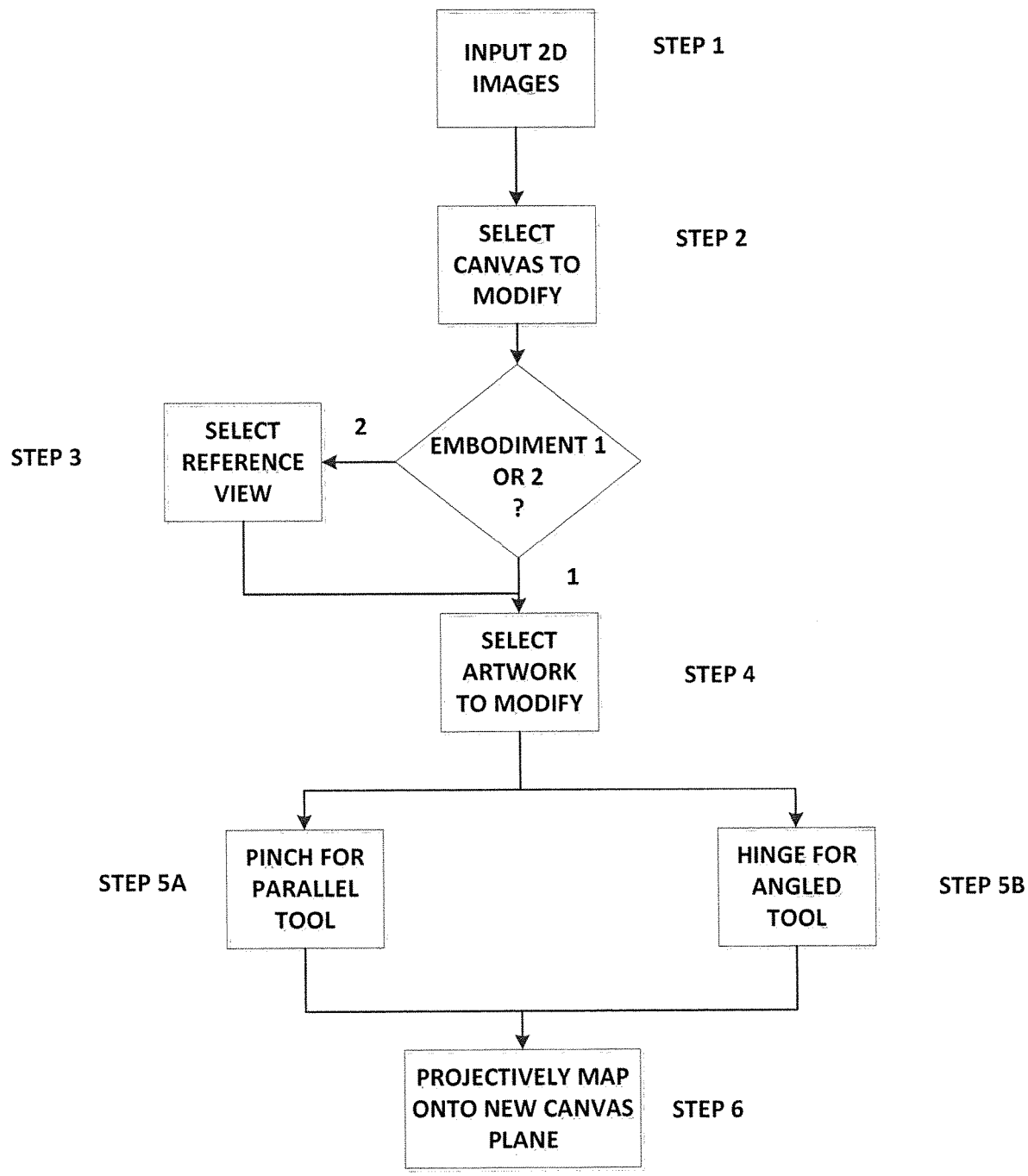
FIG. 5 provides a flow chart of an illustrative embodiment of a first method of a converting a single 2D drawing or image into a navigable, 3D computer graphics representation of a scene.

Referring to FIG. 5, in a first step, one or more, individual 2D drawings or images, e.g., artwork, may be input into the processing device (STEP 1). The 2D drawings or images may be input (STEP 1) in vector form, in raster form, or in a combination of vector and raster forms. Alternatively, one may input the 2D drawings or images (STEP 1) consisting of a plurality of layers, such as those created in ADOBE PHOTOSHOP manufactured by Adobe Systems Incorporated of San Jose, Calif., ADOBE ILLUSTRATOR manufactured by Adobe Systems Incorporated of San Jose, Calif., and the like.

Figure 1:
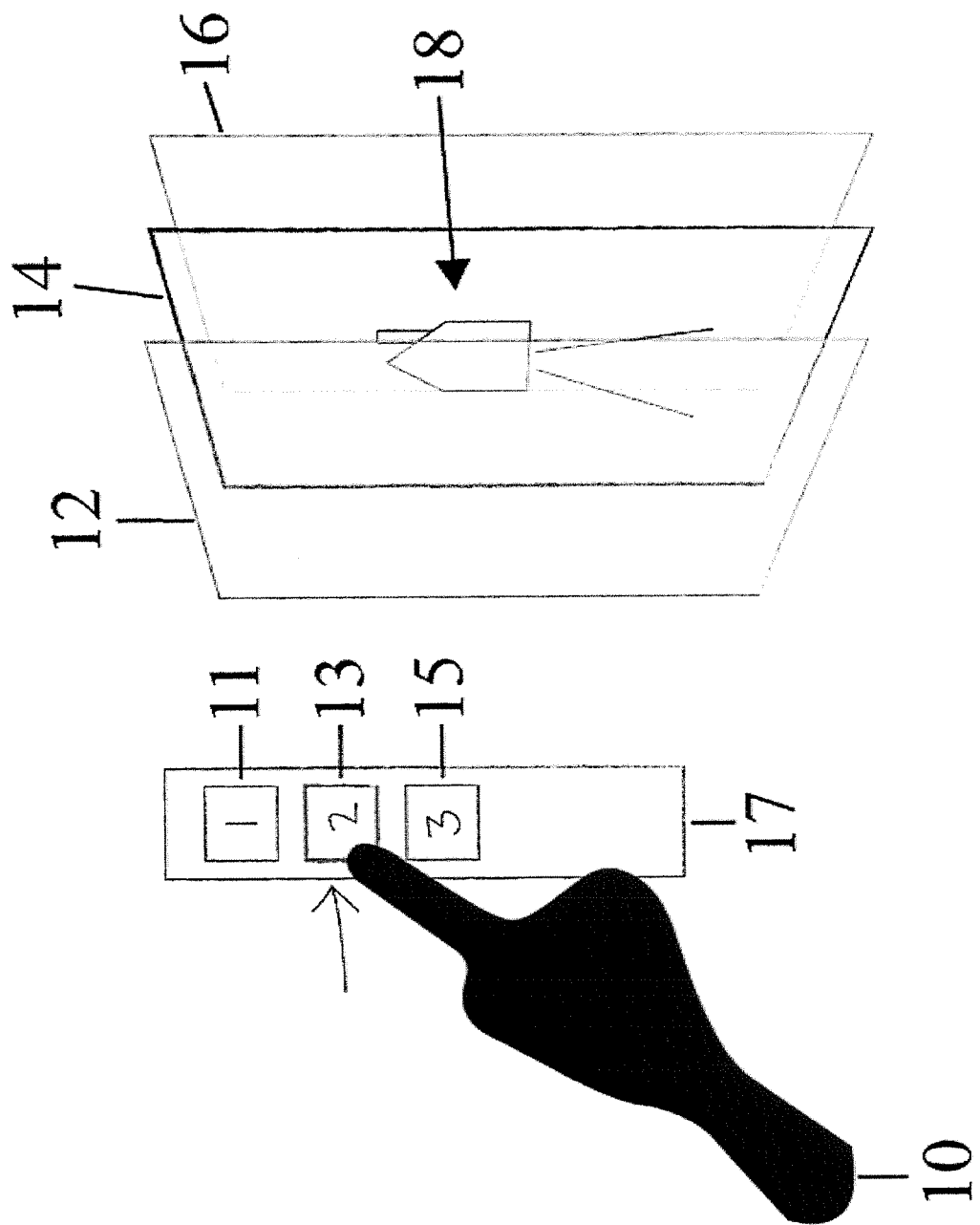
FIG. 1 illustrates an exemplary method of selecting a canvas, in accordance with some embodiments of the present invention.

Once, the 2D drawings or images have been input (STEP 1), the user may select a canvas (STEP 2), as well as some portion of the 2D drawings or images on the canvas (STEP 3), for modification. As shown in FIG. 1, within the 3D space of the representation of the scene, there exists a multiplicity of canvas planes 12, 14, 16 (parallel or otherwise) that may need to be modified. Although only the middle canvas plane 14 in FIG. 1 is shown with artwork 18, each canvas plane 12, 14, 16 in the 3D representation of the scene contains some 2D drawings or images that may be modified. Modification may include translating the artwork 18, such that it is closer to or farther from a virtual reference camera, and/or rotating the artwork 18 and the canvas plane 12, 14, 16 about a desired axis or rotation.

In some implementations, selecting a canvas plane for modification (STEP 2) may include using an interface, by which the user 10 may select a particular canvas plane 12, 14, 16 to modify. For example, by pressing a corresponding button 11, 13, 15, the user 10 may select a particular canvas plane 14 and its artwork 18 to modify. In some applications, the buttons 11, 13, 15 may be provided in a menu bar or a pull-down menu, using, for example, a touch-sensitive display unit 17 (hereinafter "a touchscreen"). Each button 11, 13, 15 may correspond to a discrete canvas plane 12, 14, 16. As shown in FIG. 1, selecting the middle canvas plane 14 may be accomplished by pressing the number 2 button 13 on the touchscreen 17.

Figure 2:
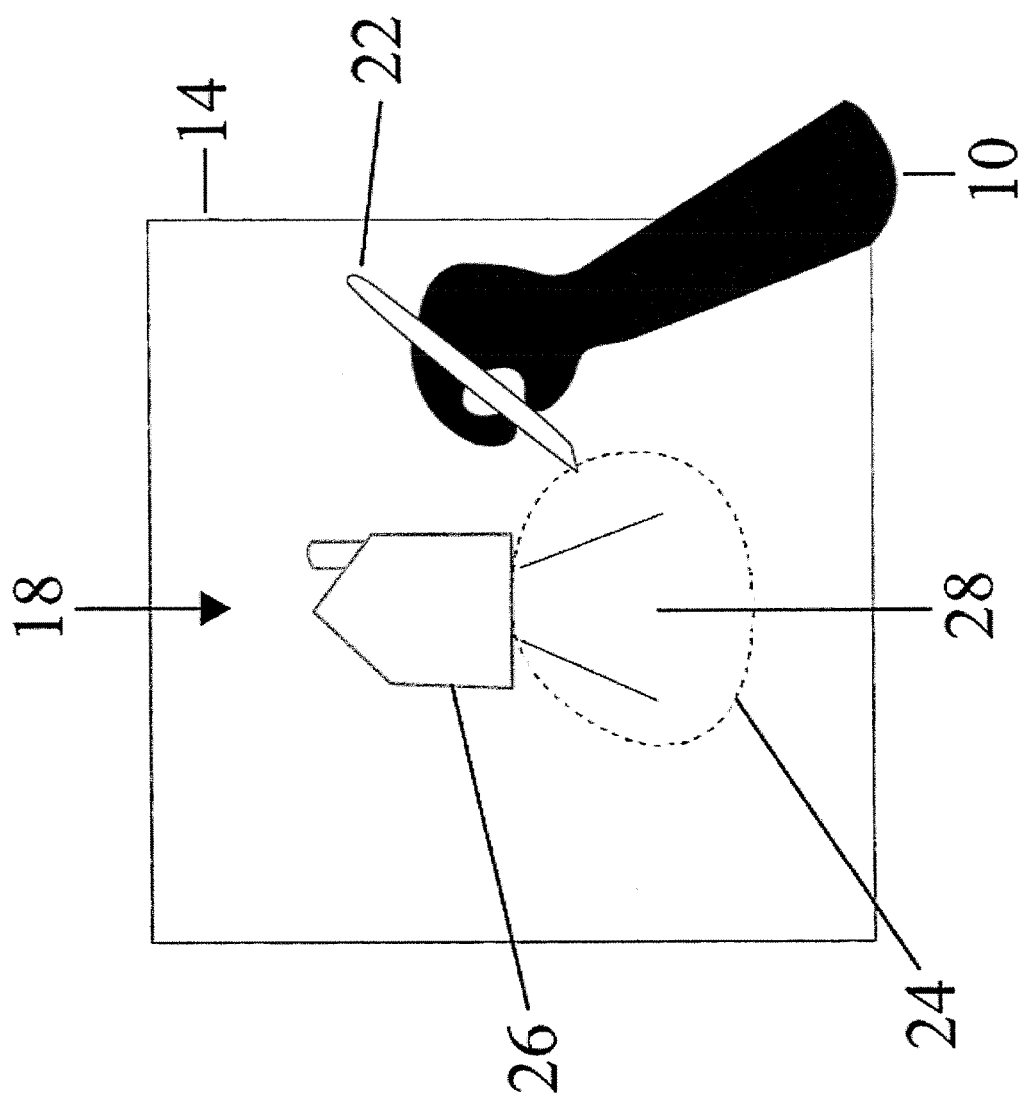
FIG. 2 illustrates an exemplary method of selecting a portion of a 2D image, in accordance with some embodiments of the present invention.

In a next step, the user 10 selects some portion of the artwork 18 on the selected canvas plane 14 (STEP 4) to modify. If no discrete portion of artwork 18 on the selected canvas plane 14 is selected, then any modifications to the selected canvas plane 14 as a whole will affect all of the artwork 18 contained thereon. Referring to FIG. 2, in some implementations, using, for example, a 2D tool 22, the user 10 may create an outline around or otherwise highlight that portion 24 of the artwork 18, e.g., a sidewalk 28, that the user 10 wants to modify at the exclusion of the remainder of the artwork 18, e.g., the house 26. In some variations, the selection of the artwork to be modified (STEP 4) may be implemented using standard selection tools 22, such as a lasso tool, a wand tool, and the like.

Having identified the portion 24 of the artwork 18 (STEP 4) on the selected canvas plane 14 to modify (STEP 2), the user 10 may freely move the selected portion of the artwork 18 in 3D space. Movement may, for example, include translating the selected portion of the artwork 18 with respect to a virtual reference camera and/or by rotating the selected portion of the artwork 18 about a definable axis.

Translating the selected portion 24 of the artwork 18 or a second, working canvas plane 35 containing the selected portion 24 of the artwork 18 to a second location and/or rotating the selected portion 24 of the artwork 18 or a second, working canvas plane 35 containing the selected portion 24 of the artwork 18 about an axis to a second orientation may be effected by choosing a "pinching for parallel" tool (STEP 5A) and/or choosing a "hinge for angled" tool (STEP 5B). According to a first embodiment of the invention, image data corresponding to the selected portion 24 of the artwork 18 may be moved to a new location and/or orientation where the image data is locked into a second, or working, canvas plane 35. In the alternate, according to a second embodiment, when the user 10 identifies the portion 24 of the artwork 18 to be moved, the software and processor executing the software may instead create, coincident with the selected canvas plane 14, a second, working canvas plane 35 that only contains the selected portion 24 of the artwork 18 to be moved. The second, working canvas plane 35 containing the selected portion 24 of the artwork 18 may then be moved, e.g., translated and/or rotated, as a whole to a second location or orientation.

According to the second embodiment, during movement, the method makes use of a reference view of a virtual reference camera to centrally project the selected portion 24 of the artwork 18 from the selected canvas plane 14 onto the second, working canvas plane 35. As a result, the user 10 may select a reference view (STEP 3) for a virtual reference camera. In some implementations, selecting a reference view (STEP 3) includes selecting a source plane (e.g., the selected canvas plane 14), selecting a target plane (e.g., the second, working canvas plane 35), and selecting a line of central projection (e.g., the view direction of the virtual reference camera). Having selected a reference view (STEP 3) and that portion 24 of the artwork 18 to move (STEP 4), as the created or generated second, working canvas plane 35 is moved in 3D space, the selected portion 24 of the artwork 18 is projectively mapped from the selected canvas plane 14 onto the moving second, working canvas plane 35. During translation operations, the second, working canvas 35 remains normal or substantially normal to the reference view of the virtual reference camera, such that the selected portion 24 of the artwork 18 may remain centrally projected onto the second, working canvas plane 35 (STEP 6).

Figure 3A:
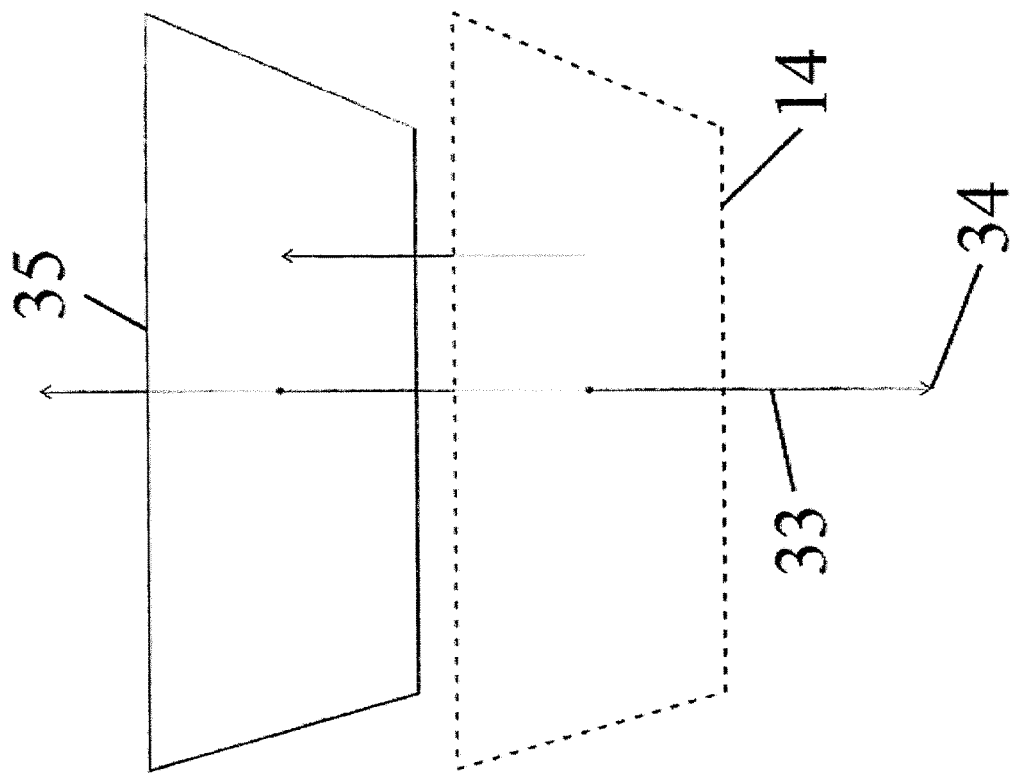
FIG. 3A illustrates an exemplary method of creating a parallel canvas, in accordance with some embodiments of the present invention.
Figure 3A:
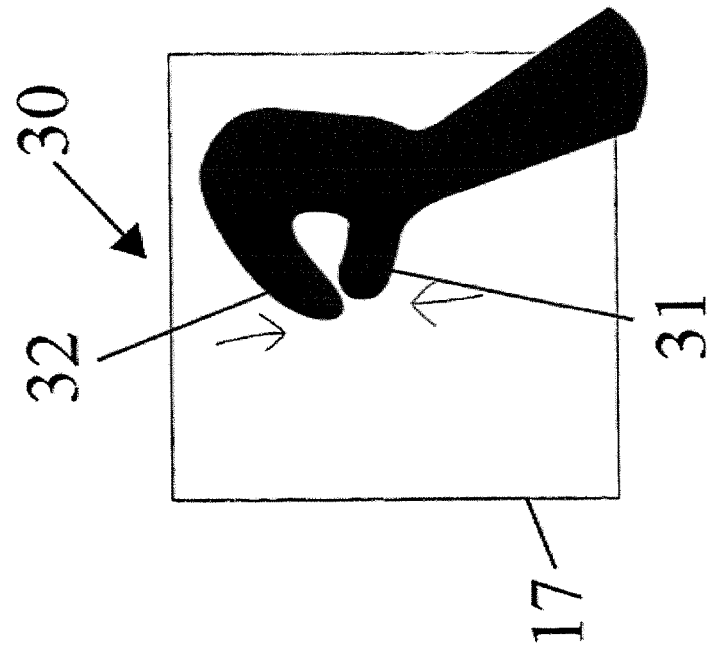

For either the first or the second embodiment, a variation of using a "pinching for parallel" tool (STEP 5A) is shown, for the purpose of illustration and not limitation, in FIG. 3A. In the example, if a user 10 wishes to modify a depth of the selected portion 24 of the artwork 18, e.g., to move selected artwork 18 closer to or farther away from the virtual reference camera 34, the user 10 may choose a "pinching for parallel" tool 30 associated with the touchscreen 17. In some applications, the "pinching for parallel" tool 30 allows the user 10 to pinch together a thumb 31 and index finger 32 (or, alternatively, two other digits) against the surface of a touchscreen 17. Such an action against the surface of the touchscreen 17 causes the software and the processor executing the software to move the selected portions 24 of the artwork 18 (e.g., first embodiment) or a second, working canvas plane 35 containing the selected portions 24 of selected artwork 18 (e.g., second embodiment) farther away from the virtual reference camera 34 to a second location. For the first embodiment, once the translation has been completed, the selected portions 24 of selected artwork 18 are locked onto a second, working canvas plane 35 at the location created for that purpose. For the second embodiment, in some variations, the software and processor executing the software may create a second, working canvas plane 35, containing the selected portion 24 of the artwork 18, coincident with the selected canvas plane 14. The finger action against the surface of the touchscreen 17 may result in the second, working canvas plane 35 and the selected portion 24 of the artwork 18 thereon translating together to the second location. During this translation operation, the second, working canvas 35 remains normal or substantially normal to the axis 33, i.e., the reference view, of the virtual reference camera 34 and the selected portion 24 of the artwork 18 remains centrally projected onto the second, working canvas 35 (STEP 6).

The "pinching for parallel" tool 30 also enables the user 10 to pinch apart the thumb 31 and index finger 32 (or, alternatively, two other digits) against the surface of the touchscreen 17. Such an action against the surface of the touchscreen 17 causes the software and the processor executing the software to move the selected portions 24 of the artwork 18 (e.g., first embodiment) or a second, working canvas plane 35 containing the selected portions 24 of selected artwork 18 (e.g., second embodiment) closer towards the virtual reference camera 34 to a second location. For the first embodiment, once the translation has been completed, the selected portions 24 of selected artwork 18 are again locked onto a second, working canvas plane 35 at the location created for that purpose. For the second embodiment, in some variations, the software and processor executing the software may create a second, working canvas plane 35, containing the selected portions 24 of the artwork 18, coincident with the selected canvas plane 14. The finger action against the surface of the touchscreen 17 may result in the second, working canvas plane 35 and the selected portions 24 of artwork 18 thereon translating together to the second location. During this translation operation, the second, working canvas 35 remains normal or substantially normal to the axis 33, i.e., the reference view, of the virtual reference camera 34 and the selected portion 24 of the artwork 18 remains centrally projected onto the second, working canvas 35. In summary, pinching together against the surface of the touchscreen 17 makes the artwork 18 on the second, working canvas 35 appear smaller or more distant with respect to the virtual reference camera 34, while pinching apart against the surface of the touchscreen 17 makes the artwork 18 on the second, working canvas 35 appear larger or closer with respect to the virtual reference camera 34.

Figure 3B:
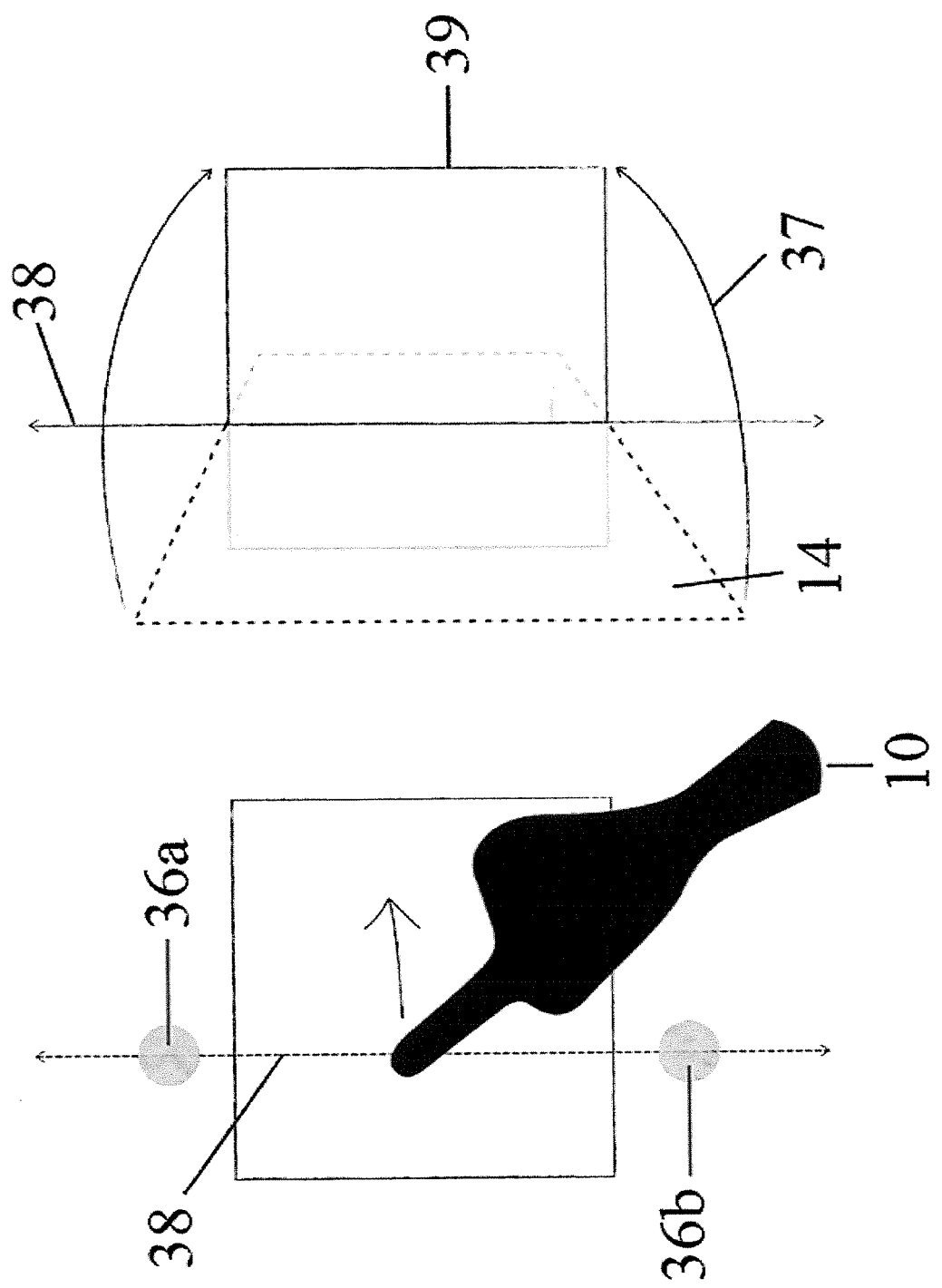
FIG. 3B illustrates an exemplary method of creating an axis or rotation hinge on a canvas, in accordance with some embodiments of the present invention.

In another operation, if the user 10 wishes to modify the orientation of the selected canvas plane 14 or a second, working canvas plane 39 by rotating the canvas plane, the user 10 may choose the "hinge for angled" tool (STEP 5B). In some variations, referring to FIG. 3B, the "hinge for angled" tool allows the user 10 to specify, on or within the selected canvas plane 14 or on or within the second, working canvas plane 39, an axis of rotation 38 about which and an angle of rotation through which the selected portions 24 of the artwork 18 may be rotated. In short, as shown in FIG. 3B, any selected artwork on the selected canvas plane 14 (e.g., first embodiment) of the second, working canvas plane 39 may be rotated about the defined axis of rotation 38 through a desired angle of rotation 37. The "hinge for angled" tool is described in detail in U.S. patent application Ser. No. 14/610,646.

In summary, software and a processor executing that software provide a chosen tool (STEP 5A, STEP 5B) that may be used to move selected portions 24 of artwork 18 initially disposed on a selected canvas plane 14 to a position and/or orientation on a second, working canvas 35, 39 anywhere in 3D space. Advantageously, during these processes, the selected portions 24 of the artwork 18 being moved may be viewed, e.g., using a split screen, from multiple points of view or cameras. For example, the artwork 18 may be viewed from the reference camera 34 and/or from a freely changeable view, which enables the user 10 to easily place and continue to modify their content in 3D space.

Figure 4D:
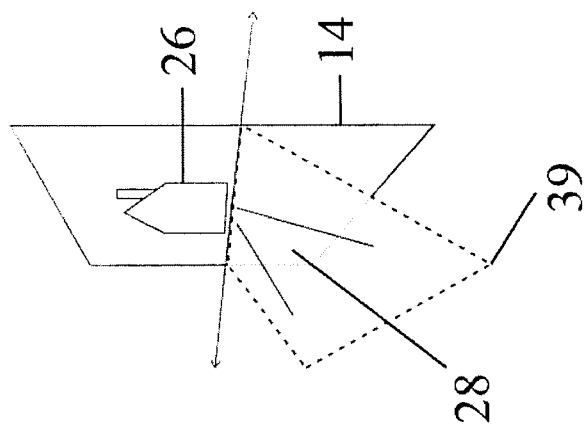
FIGS. 4C and 4D illustrate another exemplary method of placing and projecting a 2D image onto a new canvas, in accordance with some embodiments of the present invention.

Referring to FIGS. 4A-4D, the placement and modification of multiple canvasses making up a 3D representation of a scene, in which each canvas includes its own 2D drawing or image within 3D space, are shown. FIG. 4B shows an illustrative embodiment of a first canvas 40 and a second canvas 41 in parallel. The 2D drawing or image (i.e., the artwork) on the first (selected) canvas 40 is a house 26, while the 2D drawing or image (i.e., the artwork) on the second (unselected) canvas 41 is a sidewalk 28. As shown in FIG. 4A, having identified the image of the house 26 on the first canvas 40 as the selected content 24 to be modified, as previously described, by pinching apart the user's fingers against the surface of the touchscreen 17, the first (selected) canvas 40 and the image of the house 26 are moved spatially closer towards the second (unselected) canvas 41 and the image of the sidewalk 28, while the canvasses 40, 41 remain normal or substantially normal to the axis of the virtual reference camera 34 and the house 26 on the first canvas 40 remains centrally projected. As previously described, pinching apart would make the image of the house 26 on the first (selected) canvas 40 appear larger with respect to the image of sidewalk 28 on the second (unselected) canvas 41.

Figure 4C:
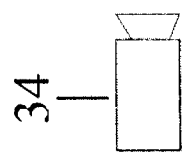
Figure 4C:
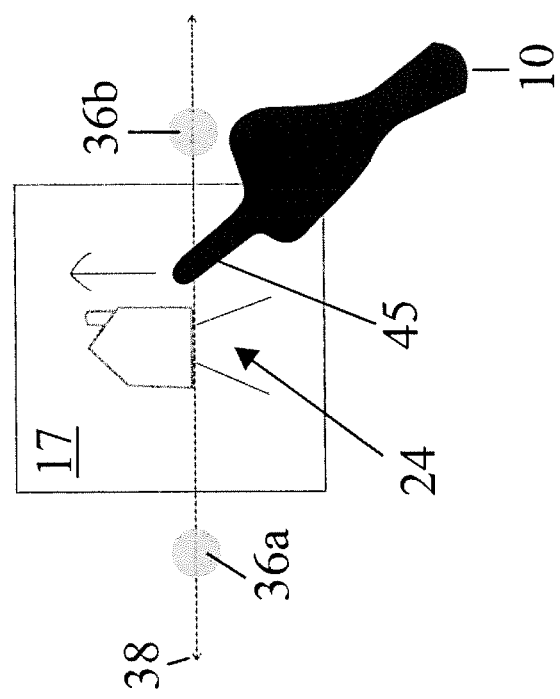

FIGS. 4C and 4D show an exemplary "hinge for angled" operation. Assuming that the user 10 has selected the image of the sidewalk 28 for modification, the user 10 identifies, e.g., by pressing a digit, stylus, and the like, against the touchscreen 17, a first point 36a and a second point 36b, to define an axis of rotation 38 within the selected canvas plane 14. Having selected the sidewalk 28 and defined the axis of rotation 38, the user 10 may rotate the selected portion 24 of the artwork 18 i.e., the sidewalk 24, and the second, working canvas plane 39 about the axis of rotation 38. For example, rotating the second, working canvas plane 39 may be effected by dragging a digit 45 across the surface of the touchscreen 17, e.g., in a direction that is perpendicular or substantially perpendicular to the axis of rotation 38. For example, dragging a digit 45 across the touchscreen 17 in the direction of the arrow shown in FIG. 4C, results in the second, working canvas plane 39 rotating about the axis of rotation 38 while the image of the house 26 and the reference canvas plane 14 remain fixed, as shown in FIG. 4D. In some variations, the magnitude of the digit dragging distance may determine the angle of rotation 37. Hence, different angles of rotation 37 may be used to create in 3D space a second, working canvas plane 39 displaying the selected image 24 of the sidewalk 28 rotated out of the reference canvas plane 14 in which the non-selected (house 26) image remains.

Advantageously, the projection described in these steps maps each point of the reference canvas 14 along a line of sight, or view direction 33, from the virtual reference camera 34 until the point is projected onto the second, working canvas plane 35, 39. This is a standard central projection used in computer graphics. In the case of raster data, this projection is done for each pixel of the data on the canvas. In the case of vector data, the projection is done to each of the geometric control points on the original canvas's drawing data.

When completed with a first image or group of images, the user 10 may accept all changes and then continues work, repeating these steps as necessary for other portions of the 3D representation of the scene involving other 2D images and artwork of their base drawing.

Figure 6:
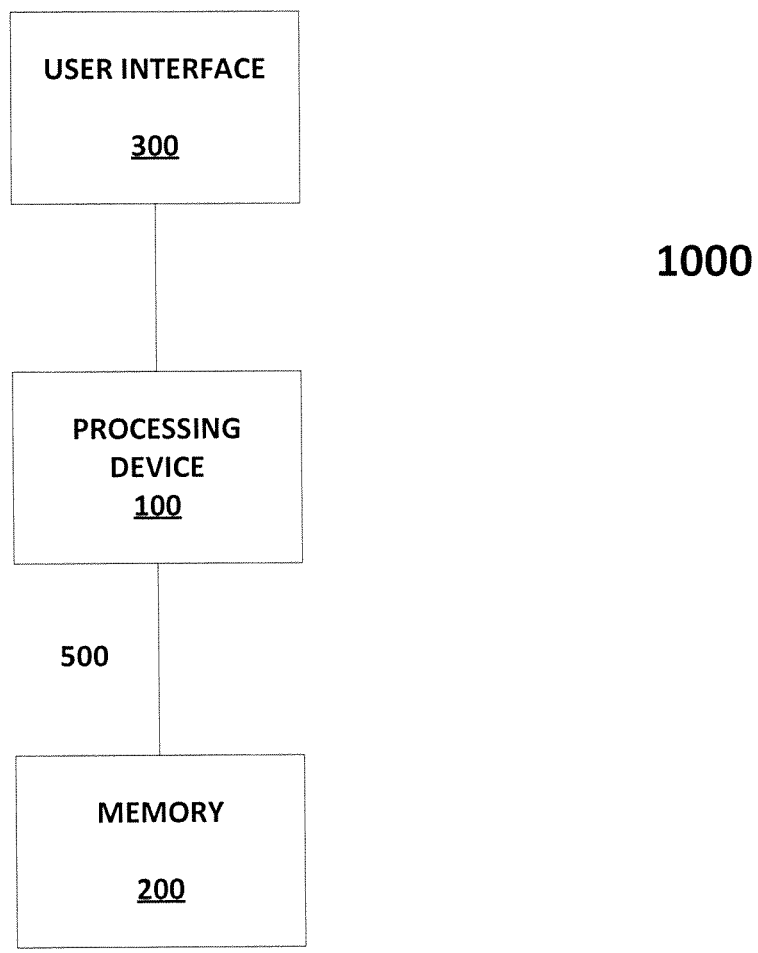
FIG. 6 provides an illustrative graphics system for converting 2D drawings or images into a 3D graphical representation of a scene, in accordance with some embodiments of the present invention.

Having described a method, a computer graphics system 1000 for converting 2D drawings or images into a 3D graphical representation of a scene will be described. Referring to FIG. 6, in some embodiments, the system 1000 includes a processing device 100, memory 200, and a user interface 300 that are in electronic communication with each other via wireless or hard-wired communication. Components of the system 1000 may be coupled by an interconnection element such as a bus 500. The bus 500 enables communications, e.g., the transfer of data and instructions, to be exchanged, e.g., wirelessly or by hardwire, internally between components and externally between system components. Thus, the bus 500 may include one or more physical busses, e.g., between components that are integrated within the system 1000, as well as a communication coupling between system elements, e.g., specialized or standard computing bus technologies such as IDE, SCSI, PCI, and InfiniBand. In some variations, components of the system 1000 may be disposed in the same physical server and, thus, physical connectivity between the components may not be required.

The processing device 100 may include an operating system that manages at least a portion of the hardware elements included therein. Usually, a processing device 100 or controller executes an operating system which may be, for example, a Windows-based operating system (e.g., Windows 7, Windows 2000 (Windows ME), Windows XP operating systems, and the like, available from the Microsoft Corporation), a MAC OS System X operating system available from Apple Computer, a Linux-based operating system distributions (e.g., the Enterprise Linux operating system, available from Red Hat Inc.) or a UNIX operating system available from various sources. Many other operating systems may be used, and embodiments are not limited to any particular implementation. Operating systems conventionally may be stored in memory 200.

The processing device 100 and the operating system together define a processing platform for which application programs in high-level programming languages may be written. These component applications may be executable, intermediate (for example, C–) or interpreted code which communicate over a communication network (for example, the Internet) using a communication protocol (for example, TCP/IP). Similarly, aspects in accordance with the present invention may be implemented using an object-oriented programming language, such as SmallTalk, Java, C++, Ada, or C # (C-Sharp). Other object-oriented programming languages may also be used. Alternatively, functional, scripting, or logical programming languages may be used. For instance, aspects of the system may be implemented using an existing commercial product, such as, for example, Database Management Systems such as SQL Server available from Microsoft of Seattle, Wash., and Oracle Database from Oracle of Redwood Shores, Calif. or integration software such as Web Sphere middleware from IBM of Armonk, N.Y. However, a computer system running, for example, SQL Server may be able to support both aspects in accordance with the present invention and databases for sundry applications not within the scope of the invention. In one or more of the embodiments of the present invention, the processing device 100 may be adapted to execute at least one application, algorithm, driver program, and the like. The applications, algorithms, driver programs, and the like that the processing device 100 may process and may execute can be stored in memory 200.

The processing device 100 may also perform functions outside the scope of the invention. In such instances, aspects of the system 1000 may be implemented using an existing commercial product, such as, for example, Database Management Systems such as SQL Server available from Microsoft of Seattle, Wash., and Oracle Database (Spatial) from Oracle of Redwood Shores, Calif. or integration software such as Web Sphere middleware from IBM of Armonk, N.Y. However, a computer system running, for example, SQL Server may be able to support both aspects in accordance with the present invention and databases for sundry applications not within the scope of the invention.

"Memory" 200 may be used for storing programs and data during operation of the system 1000. Memory 200 can be multiple components or elements of a data storage device(s) or, in the alternate, can be stand-alone devices. More particularly, memory 200 can include volatile storage, e.g., random access memory (RAM), and/or non-volatile storage, e.g., a read-only memory (ROM). The former may be a relatively high performance, volatile, random access memory such as a dynamic random access memory (DRAM) or static memory (SRAM). Various embodiments in accordance with the present invention may organize memory 200 into particularized and, in some cases, unique structures to perform the aspects and functions disclosed herein.

User interfaces 300, e.g., graphical user interfaces (GUI), touch-sensitive display units, and the like, provide a vehicle for human interaction, with a machine, e.g., the processing device 100, in which the human user provides input to direct the machine's actions while the machine provides output and other feedback to the user for use in future input. User interfaces 300 are well known to the art and will not be described in detail except in connection with the computer graphics system 1000 of the present invention. In the current context, in some embodiments, the user interface 300 enables the user to convert a single 2D drawing or image into a navigable, 3D computer graphics representation of a scene. As mentioned previously, the entire original working virtual canvas can be an "object" as that term is used herein. Although the system 1000 will be described in terms of a single stroke or multiple strokes as objects, those skilled in the art can appreciate that the object could be any form of an image, texture, and so forth.

Those of ordinary skill in the art may realize that the invention may be embodied in other specific forms without departing from the spirit or essential characteristics thereof.

The foregoing embodiments, together with the attached drawings, are, therefore, to be considered in all respects illustrative rather than limiting of the invention described herein.

What we claim is:

1. A computer-implemented method of converting two-dimensional image data into a navigable three-dimensional computer graphics representation of a scene using a non-tracking system having a graphical user interface with a touch-sensitive display unit, the method comprising:
   inputting stored image data from a file;
   embedding the input data into a first two-dimensional plane;
   positioning a single virtual reference camera within the three-dimensional space relative to the first two-dimensional plane;
   selecting, by the touch-sensitive display unit, some portion of the embedded input image data;
   arranging, by the touch-sensitive display unit, a position or an orientation of second and third two-dimensional planes in virtual three-dimensional space;
   transferring the selected content from the first two-dimensional plane to the second and third two-dimensional planes via central projection using the single virtual reference camera as a projection center; and
   outputting a constructed three-dimensional computer graphics representation of the scene to a second file, wherein the constructed three-dimensional computer graphics representation of the scene comprises at least one of the position or the orientation of the arranged first, second, and third two-dimensional planes, such that the projected image from the position of the single virtual reference camera relative to the first two-dimensional plane, the second two-dimensional plane, and the third two-dimensional plane is unchanged.

2. The method of claim 1, wherein the two-dimensional image data comprise data input in raster form.

3. The method of claim 1, wherein the two-dimensional image data comprise data input in vector form.

4. The method of claim 1, wherein the two-dimensional image data comprise data input as a combination of raster and vector form.

5. The method of claim 1, wherein the two-dimensional image data is input in multiple two-dimensional layers.

6. The method of claim 1, wherein the three-dimensional graphics representation of the scene is built concurrently with introducing additional portions of the two-dimensional image data onto additional two-dimensional planes into the virtual three-dimensional space.

7. The method of claim 1 further comprising updating the three-dimensional computer graphics representation of the scene.

8. The method of claim 7, wherein updating the three-dimensional computer graphics representation of the scene comprises:
   selecting for modification a two-dimensional plane from the file, the two-dimensional plane having a current camera view;
   designating the position or the orientation of the selected two-dimensional plane to modify;
   positioning a reference camera within the three-dimensional space;
   at least one of selecting and creating a fourth two-dimensional plane;

choosing at least one of:
  a pinching hand gesture for modifying a distance between the reference camera and the fourth two-dimensional plane, and
  establishing an axis of rotation on the selected two-dimensional plane about which some portion of the fourth two-dimensional plane may be rotated; and
centrally projecting some portion of the content from the selected two-dimensional plane onto the fourth two-dimensional plane using the reference camera as a projection center.

9. The method of claim 8, wherein designating the position and the orientation of the selected two-dimensional plane to modify comprises using at least one of a wand tool and a lasso tool.

10. The method of claim 8, wherein pinching a user's fingers together against the touch-sensitive display unit moves the fourth two-dimensional plane further away from the reference camera.

11. The method of claim 8, wherein pinching a user's fingers apart against the touch-sensitive display unit moves the fourth two-dimensional plane closer to the reference camera.

12. The method of claim 8, wherein establishing an axis of rotation comprises designating a first point on the touch-sensitive display unit and a second point on the touch-sensitive display unit through which the axis of rotation passes.

13. The method of claim 8, further comprising rotating the fourth two-dimensional plane about the axis of rotation.

14. The method of claim 13, wherein rotating the fourth two-dimensional plane about the axis of rotation comprises running a user's finger along the touch-sensitive display unit in a direction of desired rotation from the axis of rotation.

15. The method of claim 7, wherein updating the three-dimensional computer graphics representation of the scene comprises at least one of translating and rotating a fourth two-dimensional plane in three-dimensional space, such that a two-dimensional image on the selected two-dimensional plane remains centrally projected onto the fourth two-dimensional plane.

16. The method of claim 7, wherein updating the three-dimensional computer graphics representation of the scene comprises:
  selecting a fourth two-dimensional plane to modify;
  designating some portion of the fourth two-dimensional plane to modify; and
  choosing at least one of:
    a pinching hand gesture for modifying a distance between a first location of the portion of the fourth two-dimensional plane within the three-dimensional space and a second location of the portion of the fourth two-dimensional plane; and
    establishing an axis of rotation on the fourth two-dimensional plane about which the portion of the fourth two-dimensional plane may be rotated.

17. The method of claim 1, wherein outputting the constructed three-dimensional computer graphics representation of the scene to the second file further comprises outputting an encoding as to which portion of embedded image data is on which plane with the position or the orientation of the arranged first, second, and third two-dimensional planes.

18. The method of claim 1 further comprising:
  selecting, by the touch-sensitive display unit, some portion of the embedded input image data and transferring the selected portion onto a fourth two-dimensional plane that differs from the first two-dimensional plane, from the second two-dimensional plane, and from the third two-dimensional plane, such that a position or an orientation of the fourth two-dimensional plane is adjustable by a user;
  arranging, by the touch-sensitive display unit, a position or an orientation of the first, the second, the third, and the fourth two-dimensional planes in virtual three-dimensional space; and
  outputting the constructed three-dimensional computer graphics representation of the scene to the second file, wherein the constructed three-dimensional computer graphics representation of the scene comprises the position or the orientation of the arranged first, second, third, and fourth two-dimensional planes.

19. A system for generating a navigable three-dimensional graphic scene space from at least one two-dimensional drawing, the system comprising:
  a programmable processor;
  a touch-sensitive display unit; and
  memory for storing machine-readable instructions executable by the processor, wherein, when executed, the instructions cause the processor to:
    input stored image data from a file;
    embed the input data into a first two-dimensional plane;
    position a single virtual reference camera within the three-dimensional space relative to the first two-dimensional plane;
    select, by the touch-sensitive display unit, some portion of the embedded input image data;
    arrange, by the touch-sensitive display unit, a position or an orientation of second and third two-dimensional planes in virtual three-dimensional space;
    transfer the selected content from the first two-dimensional plane to the second and third two-dimensional planes via central projection using the single virtual reference camera as a projection center; and
    output a constructed three-dimensional computer graphics representation of the scene to a second file, wherein the constructed three-dimensional computer graphics representation of the scene comprises at least one of the position or the orientation of the arranged first, second, and third two-dimensional planes, such that the projected image from the position of the single virtual reference camera relative to the first two-dimensional plane, the second two-dimensional plane, and the third two-dimensional plane is unchanged.

* * * * *